(12) United States Patent (10) Patent No.: US 8,523,194 B2
Smirman (45) Date of Patent: Sep. 3, 2013

(54) FOREFOOT WEDGE INSERT FOR FOOTWEAR

(76) Inventor: Marie Smirman, Rochester Hills, MI (US)

(*) Notice: Subject to any disclaimer, the term of this patent is extended or adjusted under 35 U.S.C. 154(b) by 538 days.

(21) Appl. No.: 12/760,370

(22) Filed: Apr. 14, 2010

(65) Prior Publication Data

US 2010/0263231 A1 Oct. 21, 2010

Related U.S. Application Data

(60) Provisional application No. 61/169,346, filed on Apr. 15, 2009, provisional application No. 61/169,350, filed on Apr. 15, 2009, provisional application No. 61/169,493, filed on Apr. 15, 2009.

(51) Int. Cl.
*A63C 1/30* (2006.01)
*A61F 5/14* (2006.01)
*A43B 19/00* (2006.01)
*A43B 23/08* (2006.01)

(52) U.S. Cl.
USPC .............. 280/11.18; 36/144; 36/143; 36/142; 36/71; 36/115; 36/77 R (58) Field of Classification Search
USPC .................. 36/144, 143, 142, 71, 115, 77 R, 36/159, 140; 280/11.18
See application file for complete search history.

(56) References Cited

U.S. PATENT DOCUMENTS

| 1,822,981 A | 9/1931 | Prouty |
| 1,946,317 A * | 2/1934 | Hall ................................ 36/145 |
| 2,050,210 A | 8/1936 | Griffin |
| 2,785,480 A | 3/1957 | MacCarone |
| 2,838,776 A | 6/1958 | Tax |
| 2,990,629 A * | 7/1961 | McLaughlin .................... 36/173 |
| 3,316,663 A * | 5/1967 | Neu .................................. 36/71 |
| 3,339,555 A * | 9/1967 | Rotko ............................. 36/165 |
| 3,481,820 A | 12/1969 | Jonas |
| 3,997,984 A | 12/1976 | Hayward |
| 4,083,128 A | 4/1978 | Rossman |
| 4,253,252 A | 3/1981 | Eisenberg |
| 4,301,564 A | 11/1981 | Dalebout |
| 4,333,472 A * | 6/1982 | Tager .............................. 36/140 |
| 4,348,821 A | 9/1982 | Daswick |
| 4,385,456 A | 5/1983 | Livernois et al. |
| 4,399,620 A | 8/1983 | Funck |
| 4,413,430 A | 11/1983 | Brown |

(Continued)

OTHER PUBLICATIONS

Peter Waldman, Figure Skaters Blame Boot Design for Injury Plague, Wall Street Journal, Feb. 17, 2006.

*Primary Examiner* — Ted Kavanaugh
(74) *Attorney, Agent, or Firm* — Preston Smirman; Smirman IP Law, PLLC (57) ABSTRACT

A forefoot wedge insert, and methods for forming same, are described for a piece of footwear, such as but not limited to ice skating boots, or a shoe, such as but not limited to exercise, therapeutic, or physiological footwear, for correcting a pronation and/or supination condition wherein the insert permits the subtalar joint of the affected foot to be placed and/or maintained in a neutral position. In this manner, the insert can provide the corrected foot with adequate balance relative to the skate blade during typical ice skating maneuvers. Also described is a skating boot, or shoe, having an adjustable toe cap portion that is selectively operable to be raised up to accommodate the uplifted forefoot portion of the wearer when the forefoot wedge insert is being used.

4 Claims, 6 Drawing Sheets

(56) References Cited

U.S. PATENT DOCUMENTS

| | | |
|---|---|---|
| 4,731,940 A | 3/1988 | Zanetta et al. |
| 4,783,911 A | 11/1988 | Brown |
| 4,869,001 A | 9/1989 | Brown |
| 5,101,580 A | 4/1992 | Lyden |
| 5,203,793 A | 4/1993 | Lyden |
| 5,253,435 A | 10/1993 | Auger et al. |
| 5,257,470 A | 11/1993 | Auger et al. |
| 5,265,350 A | 11/1993 | MacPhail |
| 5,327,664 A | 7/1994 | Rothbart |
| 5,459,949 A | 10/1995 | MacPhail |
| 5,555,584 A | 9/1996 | Moore et al. |
| 5,625,965 A | 5/1997 | Blissett et al. |
| 5,632,057 A | 5/1997 | Lyden |
| 5,647,147 A | 7/1997 | Coomer |
| 5,794,362 A | 8/1998 | Polk, III et al. |
| 5,860,330 A | 1/1999 | Code et al. |
| 5,924,218 A | 7/1999 | Dalvy et al. |
| 5,926,978 A * | 7/1999 | Smith .............................. 36/101 |
| 6,082,027 A | 7/2000 | Wagonhurst |
| 6,092,314 A | 7/2000 | Rothbart |
| 6,105,283 A | 8/2000 | Park |
| 6,141,889 A | 11/2000 | Baum |
| 6,170,176 B1 * | 1/2001 | Clough ........................... 36/140 |
| 6,212,723 B1 | 4/2001 | Rothbart |
| 6,394,469 B1 | 5/2002 | Borel |
| 6,412,198 B1 * | 7/2002 | Rothbart ......................... 36/144 |
| 6,442,875 B1 | 9/2002 | Joubert et al. |
| 6,477,793 B1 | 11/2002 | Pruitt et al. |
| 6,505,422 B2 | 1/2003 | Racine |
| 6,598,319 B2 | 7/2003 | Hardt |
| 6,647,576 B2 | 11/2003 | Racine |
| 6,939,502 B2 | 9/2005 | Lyden |
| 7,039,977 B2 | 5/2006 | Wilder |
| 7,069,665 B1 * | 7/2006 | Adriano ............................ 36/43 |
| 7,107,235 B2 | 9/2006 | Lyden |
| 7,299,568 B2 * | 11/2007 | Tager ............................. 36/140 |
| 7,340,852 B1 * | 3/2008 | Tai .................................. 36/100 |
| 7,360,326 B1 | 4/2008 | Tanaka |
| 7,392,990 B2 | 7/2008 | Bussiere |
| 8,122,550 B2 * | 2/2012 | Johnson .................... 12/146 M |
| 2001/0027583 A1 | 10/2001 | Rothbart |
| 2009/0094856 A1 | 4/2009 | Guerra |

\* cited by examiner

FOREFOOT WEDGE INSERT FOR FOOTWEAR

CROSS-REFERENCE TO RELATED APPLICATION

The instant application claims priority to U.S. Provisional Patent Application Ser. No. 61/169,346, filed Apr. 15, 2009, U.S. Provisional Patent Application Ser. No. 61/169,350, filed Apr. 15, 2009, and U.S. Provisional Patent Application Ser. No. 61/169,493, filed Apr. 15, 2009, the entire specifications of all of which are expressly incorporated herein by reference.

FIELD OF THE INVENTION

The present invention relates generally to inserts for footwear, such as shoes or boots, and, more specifically to a forefoot wedge insert, and methods for forming same, for a piece of footwear, such as but not limited to ice skating boots, or a shoe, such as but not limited to exercise, therapeutic, or physiological footwear, for correcting a pronation and/or supination condition wherein the insert permits the subtalar joint of the affected foot to be placed and/or maintained in a neutral position. The present invention also relates specifically to a piece of footwear, such as but not limited to ice skating boots, or a shoe, such as but not limited to exercise, therapeutic, or physiological footwear, having an adjustable toe cap portion that is selectively operable to be raised up to accommodate the uplifted forefoot portion of the wearer when the forefoot wedge insert is being used.

BACKGROUND OF THE INVENTION

Referring to FIGS. 1 and 3-4b, conventional skating boots 10 are typically constructed with a relatively stiff leather upper 12 built about a boot-like sole 14 and heel 16 platform, which are likewise relatively stiff. Accordingly, when the wearer's foot is placed into the skating boot 10, and the skating boot 10 is laced up, unless the skating boot 10 essentially form fits the wearer's foot, or the wearer has a relatively straight lower leg LL (e.g., tibia relative to the vertical axis A extending downwardly through the knee K) or the wearer has a relatively stable subtalar joint (e.g., see FIG. 3), some wearer's feet F have a tendency to roll about the ankle joint (e.g., display eversion and/or inversion characteristics with respect to the subtalar joint area). This situation is especially problematic for individuals with existing pronation and/or supination conditions, wherein significant rearfoot and/or forefoot valgus and/or varus conditions are present. For example, some of these individuals may have "bowed" lower legs LL (e.g., laterally or medially), and as a result, the supinators (e.g., see FIG. 4b) and/or the pronators (e.g., see FIG. 4a) attempt to compensate by maintaining a neutral or level foot posture relative to the skate blade SB. In these situations, the wearer of the skating boot 10 attempts to compensate for the valgus/varus conditions to maintain a subtalar neutral position in order to keep the skate blade vertically aligned with the knee/upper portion of the lower leg (e.g., proximal portion of the tibia) so as to maintain proper balance. However, because the toe cap of the skating boot forces the wearer's toes and/or forefoot down onto the foot bed surface, and because typical ice skating maneuvers with ice skating boots require the foot to be able to balance on a point of a rockered skating blade, it is virtually impossible for the wearer to consistently and constantly maintain a subtalar neutral position (i.e., neither pronating or supinating), especially if one or both of the wearer's feet naturally pronates and/or supinates to any significant degree. Needless to say, skating performance would be expected to significantly suffer under these particular circumstances.

Figures 1, 2, 3:
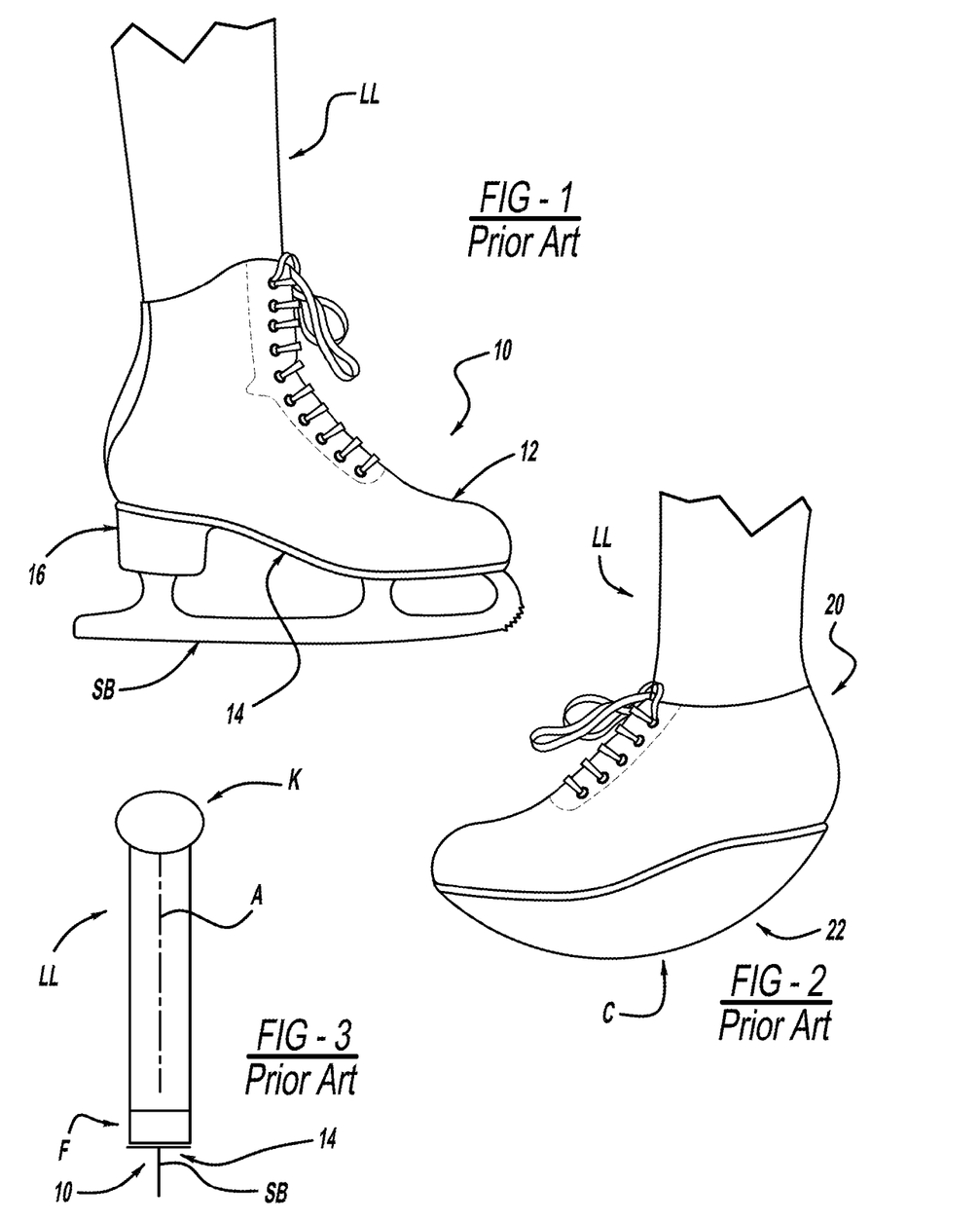
FIG. 1 is an elevational view of a boot, in accordance with the prior art.
FIG. 2 is an elevational view of a shoe, in accordance with the prior art.
FIG. 3 is a schematic view of a relatively straight lower leg having a foot in the subtalar neutral position while in a skating boot, in accordance with the prior art.

Referring specifically to FIG. 2, the shoes 20 can include exercise, therapeutic, or physiological footwear (e.g., MBT brand shoes, which are readily commercially available from Swiss Masai Marketing GmbH, St. Gallerstrasse 72, 9325 Roggwil TG, Switzerland). These types of exercise, therapeutic, or physiological footwear, which require the wearer to balance across a line extending through the center C of the width of the sole 22, generally include those types of shoes that supposedly have a number of positive effects not only on the foot but on the whole body, including toning of various muscle groups and/or alleviating stress on various joints. As with conventional skating boots, if the shoes 20 essentially form fit the wearer's feet, or the wearer has a relatively straight lower leg LL (e.g., tibia) and/or relatively stable subtalar joints, these types of shoes are typically not a problem for these individuals. However, these types of shoes can be problematic for individuals with existing pronation and/or supination conditions, wherein significant rearfoot and/or forefoot valgus and/or varus conditions are present. For example, some of these individuals may have "bowed" lower legs (e.g., laterally or medially), and as a result, the individual attempts to compensate by pronating and/or supinating to maintain a level foot posture relative to the ground. In this situation, the wearer of the shoes 20 attempts to compensate for the valgus/varus conditions to maintain a subtalar neutral position. However, because these shoes 20 require the foot to be able to balance across a line extending through the center C of the width of the sole 22, it is virtually impossible for the wearer to consistently and constantly maintain a subtalar neutral position (i.e., neither pronating or supinating), especially if one or both of the wearer's feet naturally pronates and/or supinates.

Because of these different mechanical conditions being present, the ice skater's foot needs to be positioned differently than in a conventional shoe in order to maintain constant and consistent balance over the skate blade. Without this balance, the muscles, bones, tendons and ligaments of the skater's foot (as well as other parts of the body) can become stressed and/or injured as the ankle repeatedly rolls, or attempts to roll, either laterally or medially.

Additionally, exercise, therapeutic, or physiological footwear, as described above, can also be painful for individuals with "loose" or unstable subtalar joints to walk in, as the foot constantly wants to "roll over" or pronate/supinate. For example, individuals with pronation and/or supination conditions may find walking in the afore-mentioned exercise, therapeutic, or physiological footwear difficult or painful, despite the purported health benefits.

Therefore, it would be advantageous to provide a new and improved insert for a piece of footwear, such as but not limited to ice skating boots, or a shoe, such as but not limited to exercise, therapeutic, or physiological footwear, and methods for forming same, for correcting a pronation and/or supination condition wherein the insert permits the subtalar joint of the affected foot to be placed in and/or maintained in a neutral position, that overcomes at least one of the aforementioned problems.

SUMMARY OF THE INVENTION

In accordance with the general teachings of the present invention, a new and improved forefoot wedge insert, and methods for forming same, are provided for a piece of footwear, such as but not limited to ice skating boots, or a shoe, such as but not limited to exercise, therapeutic, or physiological footwear, for correcting a pronation and/or supination condition wherein the insert permits the subtalar joint of the affected foot to be placed and/or maintained in a neutral position. In this manner, the insert can provide the corrected foot with adequate balance relative to the skate blade during typical ice skating maneuvers.

In accordance with another aspect of the present invention, a skating boot or shoe can be provided, wherein the skating boot or shoe can include an adjustable toe cap portion that is selectively operable to be raised up to accommodate the uplifted forefoot portion of the wearer when the forefoot wedge insert of the present invention is being used.

In accordance with one embodiment of the present invention, a substantially wedge-shaped insert is provided for placement on a forefoot area in a piece of footwear, wherein the insert includes a first side portion and a substantially planar top portion, wherein the top portion gradually tapers towards a second side portion spaced and opposed from the first side portion, and wherein the top portion gradually tapers towards a rear portion of the insert.

In accordance with another embodiment of the present invention, a method is provided for manufacturing an insert for correcting pronation or supination of a foot in a piece of footwear, comprising: (1) determining a varus or valgus angle of a forefoot portion of the foot; (2) determining a varus or valgus angle of a rearfoot portion of the foot; (3) determining a total wedge angle according to the following formula: total wedge angle=forefoot angle (+varus or −valgus)+rearfoot angle (+varus or −valgus); and (4) forming the insert, wherein the insert includes a first side portion, a bottom portion and a substantially planar top portion, wherein the top portion gradually tapers towards a second side portion spaced and opposed from the first side portion, and wherein the top portion gradually tapers towards a rear portion of the insert, wherein a vertex formed by the intersection of the bottom portion and the top portion has an angle substantially corresponding to the total wedge angle.

In accordance with still another embodiment of the present invention, a footwear system is provided for correcting pronation or supination of a foot, comprising: (1) a piece of footwear; (2) a substantially wedge-shaped insert for placement on a forefoot area in the piece of footwear, wherein the insert includes a first side portion and a substantially planar top portion, wherein the top portion gradually tapers towards a second side portion spaced and opposed from the first side portion, and wherein the top portion gradually tapers towards a rear portion of the insert; and (3) a toe cap portion of the piece of footwear, wherein the toe cap portion is selectively operable to be raised upwardly so as to accommodate the foot when it is positioned on the insert.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Other advantages of the present invention will be readily appreciated as the same becomes better understood by reference to the following detailed description when considered in connection with the accompanying drawings wherein.

The same reference numerals refer to the same parts throughout the various Figures.

DETAILED DESCRIPTION OF THE INVENTION

The following description of the preferred embodiment(s) is merely exemplary in nature and is in no way intended to limit the invention, or uses.

Referring generally to FIGS. 4c-10, a new and improved forefoot wedge insert 30 is provided for a piece of footwear 32, e.g., a boot, such as, but not limited to ice skating boots, or a shoe, such as, but not limited to exercise, therapeutic, or physiological footwear. The forefoot wedge insert 30 can be formed of any formable or moldable material that is substantially firm, yet comfortable, when formed, molded, cured or dried. The formable or moldable material can be used to uplift the forefoot area 36 of the wearer's foot 38 to cause the subtalar joint of the wearer to assume and/or maintain a neutral position (or as close to neutral as possible). By way of a non-limiting example, the vertical leg/foot arrangement is being "shimmed level" to the boot or shoe bottom medially/laterally (as the case may require) in the neutral position (e.g., subtalar neutral) in order to achieve relatively good alignment for the body when skating on a rockered blade (or rockered wheels for inline skates) or walking on a rockered sole (e.g., for exercise, therapeutic, or physiological footwear). In this manner, the wearer can more easily maintain the skate blade 40 in vertical alignment with the axis through the knee 42/upper leg area 44, whether they be supinators (e.g., see FIGS. 5a and 5c) or pronators (e.g., see FIGS. 5b and 5d). The wearer can then more easily balance over the skate blade 40, generally considered to be a prerequisite for proper skating technique.

In order to determine what the overall wedge height or thickness of the forefoot wedge insert 30 should be it is first necessary to determine the forefoot varus/valgus angle and the rearfoot varus/valgus angle are, and then combine the two angles to geometrically determine the overall wedge height or thickness.

With respect to pronators, the respective forefoot/rearfoot measurements will yield two different varus angles; however, it should be appreciated that one of the measurements might yield either a 0 degree angle or a very slight valgus angle (e.g., typically in the rearfoot angle measurement). However, pronators will typically yield an overall or total positive varus angle result.

With respect to supinators, the respective forefoot/rearfoot measurements will yield two different valgus angles; however, it should be appreciated that one of the measurements might yield either a 0 degree angle or a very slight varus angle (e.g., typically in the rearfoot angle measurement). However, supinators will typically yield an overall or total negative valgus angle result.

Figure 4A:
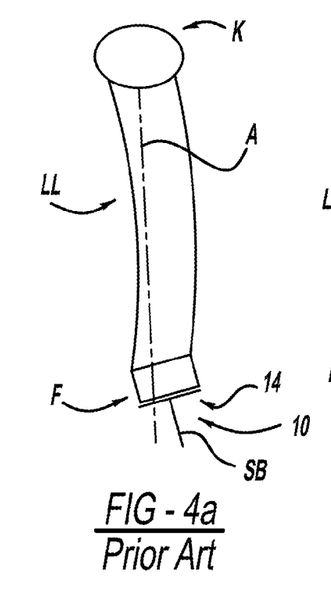
FIG. 4a is a front schematic view of a relatively bowed lower right leg having a foot in the subtalar supinated position while in a skating boot, in accordance with the prior art.
Figure 4B:
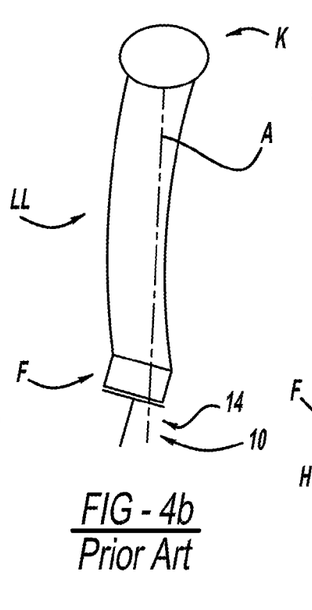
FIG. 4b is a front schematic view of a relatively bowed lower right leg having a foot in the subtalar pronated position while in a skating boot, in accordance with the prior art.
Figure 4C:
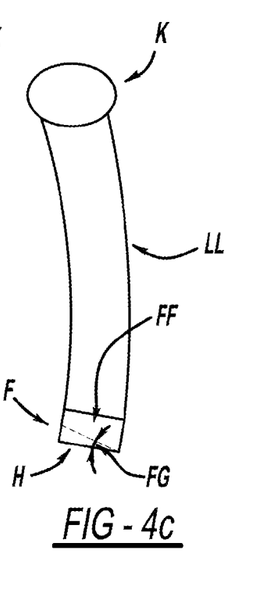
FIG. 4c is a front schematic view of a measurement step for measuring the forefoot valgus angle of the foot depicted in FIG. 4a in order to form the forefoot wedge insert of the present invention, in accordance with a first embodiment of the present invention.

Referring specifically to FIG. 4c, to determine the forefoot valgus angle for a supinator (or suspected supinator), the wearer's foot F can be held in non-weight bearing subtalar neutral position (e.g., by a podiatrist), or as close thereto as possible. An appropriate diagnostic tool, such as but not limited to a goniometer can be used to measure the valgus angle FG formed by the tilt of the bottom of the forefoot FF (indicated by the dotted line) relative to the bottom of the heel portion H. If the wearer's other foot is also affected, a similar measurement should be done for the other foot.

Figure 4D:
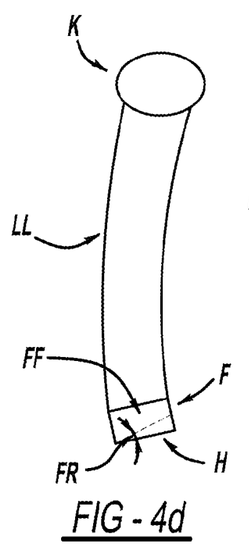
FIG. 4d is a front schematic view of a measurement step for measuring the forefoot varus angle of the foot depicted in FIG. 4b in order to form the forefoot wedge insert of the present invention, in accordance with a second embodiment of the present invention.

Referring specifically to FIG. 4d, to determine the forefoot varus angle for a pronator (or suspected pronator), the wearer's foot F can also held in non-weight bearing subtalar neutral position (e.g., by a podiatrist), or as close thereto as possible. An appropriate diagnostic tool, such as but not limited to a goniometer can be used to measure the varus angle FR formed by the tilt of the bottom of the forefoot FF (indicated by the dotted line) relative to the bottom of the heel portion H. If the wearer's other foot is also affected, a similar measurement should be done for the other foot.

Figure 4E:
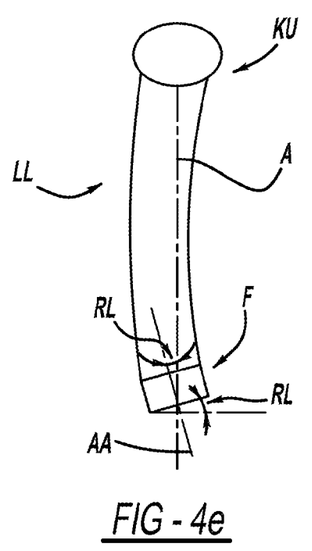
FIG. 4e is a rear schematic view of a measurement step for measuring the rearfoot valgus angle of the foot depicted in FIG. 4a in order to form the forefoot wedge insert of the present invention, in accordance with a third embodiment of the present invention.

Referring specifically to FIG. 4e, to determine the rearfoot valgus angle RL for a supinator (or suspected supinator), the wearer's foot F can again be held in non-weight bearing subtalar neutral position (e.g., by a podiatrist) or as close thereto as possible. An appropriate diagnostic tool, such as but not limited to a goniometer can be used to measure the valgus angle RL formed by the intersection of the vertical axis A extending downwardly through the knee/upper leg area KU and the vertical axis AA extending upwardly through the middle of the heel portion H. The intersection of these two axes A, AA forms a vertex of the rearfoot valgus angle RL. Without being bound to a particular theory of the present invention, it is believed that this methodology yields a better indicator of the required rearfoot valgus angle value needed to produce the forefoot wedge insert 30, than the conventional way of measuring the rearfoot valgus angle (e.g., measuring the valgus angle formed by the intersection of the vertical axis extending downwardly through the lower leg area and the vertical axis extending upwardly through the middle of the heel portion) which may lead to an under-correction. However, it should be appreciated that the present invention can also be practiced using the conventional way of measuring the rearfoot valgus angle if the wearer's tibia shows only very slight bowing or the foot shows only very slight supination. Additionally, an alternative method of determining the rearfoot valgus angle RL for a supinator (or suspected supinator), includes the wearer's foot F being held in non-weight bearing subtalar neutral position (e.g., by a podiatrist), or as close thereto as possible, wherein an appropriate diagnostic tool, such as but not limited to a goniometer can be used to measure the valgus angle RL formed by an imaginary horizontal level line HL (e.g., that is 90 degrees perpendicular to the vertical axis A extending downwardly through the knee/upper leg area KU) and a bottom most edge E of the heel portion H. The angles formed by this method and the first method of this paragraph are believed to be substantially equivalent. If the wearer's other foot is also affected, similar measurement(s) should be done for the other foot.

Figure 4F:
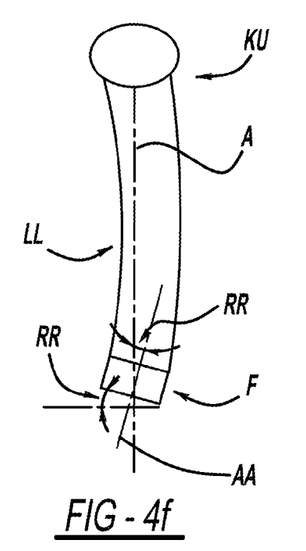
FIG. 4f is a rear schematic view of a measurement step for measuring the rearfoot varus angle of the foot depicted in FIG. 4b in order to form the forefoot wedge insert of the present invention, in accordance with a fourth embodiment of the present invention.

Referring specifically to FIG. 4f, to determine the rearfoot varus angle RR for a pronator (or suspected pronator), the wearer's foot F can again be held in non-weight bearing subtalar neutral position (e.g., by a podiatrist), or as close thereto as possible. An appropriate diagnostic tool, such as but not limited to a goniometer can be used to measure the varus angle RR formed by the intersection of the vertical axis A extending downwardly through the knee/upper leg area KU and the vertical axis AA extending upwardly through the middle of the heel portion H. The intersection of these two axes A, AA forms a vertex of the rearfoot varus angle RR. Without being bound to a particular theory of the present invention, it is believed that this methodology yields a better indicator of the required rearfoot varus angle value needed to produce the forefoot wedge insert 30, than the conventional way of measuring the rearfoot varus angle (e.g., measuring the varus angle formed by the intersection of the vertical axis extending downwardly through the lower leg area and the vertical axis extending upwardly through the middle of the heel portion) which may lead to an under-correction. However, it should be appreciated that the present invention can also be practiced using the conventional way of measuring the rearfoot varus angle if the wearer's tibia shows only very slight bowing or the foot shows only very slight pronation. Additionally, an alternative method of determining the rearfoot varus angle RR for a pronator (or suspected pronator), includes the wearer's foot F being held in non-weight bearing subtalar neutral position (e.g., by a podiatrist), or as close thereto as possible, wherein an appropriate diagnostic tool, such as but not limited to a goniometer can be used to measure the varus angle RR formed by an imaginary horizontal level line HL (e.g., that is 0 degrees perpendicular to the vertical axis A extending downwardly through the knee/upper leg area KU) and a bottom most edge E of the heel portion H. The angles formed by this method and the first method of this paragraph are believed to be substantially equivalent. If the wearer's other foot is also affected, similar measurement(s) should be done for the other foot.

To determine the total wedge angle, and thus the overall wedge height or thickness of the forefoot wedge insert 30, the forefoot angle (whether it be varus or valgus in nature) can be combined with the rearfoot angle (whether it be varus or valgus in nature) according to the following formula: Total Wedge Angle=Forefoot Angle (+varus or −valgus)+Rearfoot Angle (+varus or −valgus).

By way of a non-limiting example, a severely pronating individual has a right foot measure as follows: forefoot angle of +15 varus degrees and a rearfoot angle of +10 varus degrees. Accordingly, the total wedge angle for this right foot would be +25 varus degrees. The same individual has a left foot with the following measurements: angle of +2 varus degrees and a rearfoot angle of +1 varus degrees. Accordingly, the total wedge angle for this left foot would only be +3 varus degrees. This example highlights the necessity of taking individual measurements for each foot as there may be significant angle differences there between.

By way of another non-limiting example, a severely supinating individual has a right foot measure as follows: forefoot angle of −20 valgus degrees and a rearfoot angle of −8 valgus degrees. Accordingly, the total wedge angle for this right foot would be −28 valgus degrees. The same individual has a left foot with the following measurements: angle of −4 valgus degrees and a rearfoot angle of 0 degrees. Accordingly, the total wedge angle for this left foot would only be −4 valgus degrees. Again, this example highlights the necessity of taking individual measurements for each foot as there may be significant angle differences there between.

By way of still another non-limiting example, an individual without any overt indication of severe pronation/supination conditions has a right foot measure as follows: forefoot angle of +2 varus degrees and a rearfoot angle of −2 valgus degrees. Accordingly, the total wedge angle for this right foot would be 0 degrees, indicating that a forefoot wedge insert is not needed for this right foot. The same individual has a left foot with the following measurements: angle of −3 valgus degrees and a rearfoot angle of −3 valgus degrees. Accordingly, the total wedge angle for this left foot would be −6 valgus degrees. This example highlights the necessity of taking individual measurements for each foot.

Once the total wedge angle is determined, an appropriate geometric calculation can be performed to determine the required thickness or height (e.g., in inches, millimeters, centimeters, and/or the like) of the forefoot wedge insert 30, e.g., the height of leg L (i.e., the leg of the triangle directly opposite the vertex of the angle) formed when the two angles (i.e., forefoot and rearfoot) can be combined to form a triangle with an opposing edge of the wearer's foot bisecting the two extending lines (e.g., the adjacent leg AL and hypotenuse leg HY) from the angle.

Figure 9:
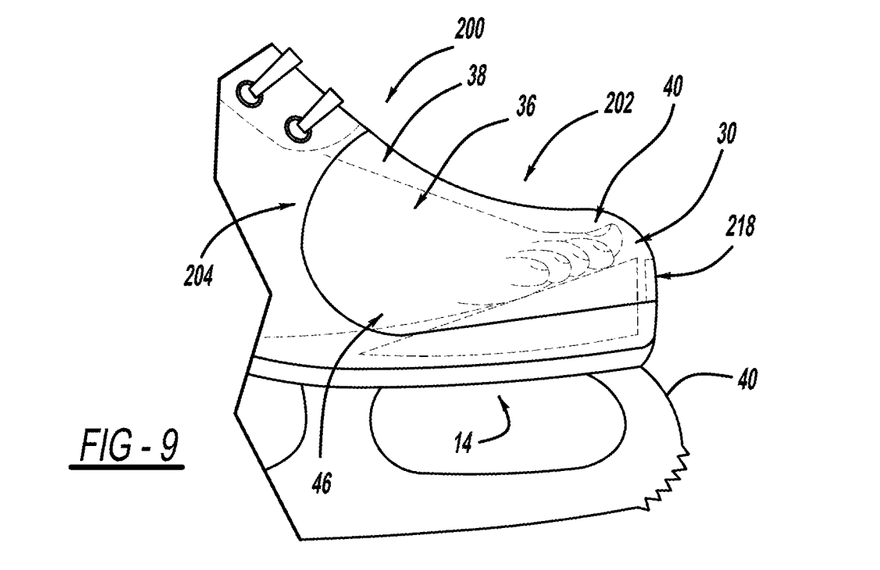
FIG. 9 is a partial elevational view of the wearer's foot inserted into the skating boot depicted in FIG. 6 with the forefoot wedge insert of the present invention, in accordance with a thirteenth embodiment of the present invention.

Referring specifically to FIG. 9, the forefoot wedge insert 30 can extend from an area corresponding to the toes 40 extending back through the ball area 46 of the foot 38, i.e., the forefoot area 36, thus providing adequate balance for the wearer's foot 38 during typical ice skating maneuvers.

Figure 5A:
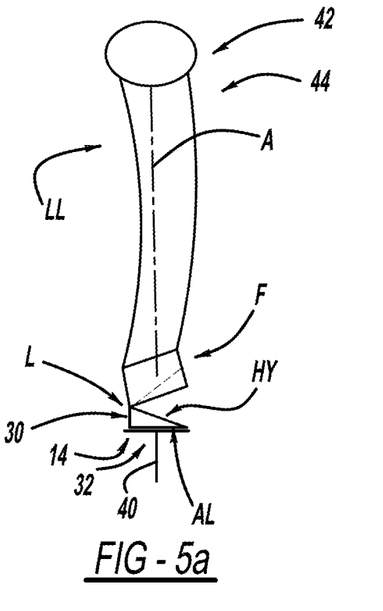
FIG. 5a is a front schematic view of the foot depicted in FIG. 4a about to be corrected with a forefoot wedge insert so that the subtalar joint will be in a neutral position while in the skating boot and/or the skate blade is substantially aligned with the vertical axis through the knee/upper leg area, in accordance with a fifth embodiment of the present invention.
Figure 5B:
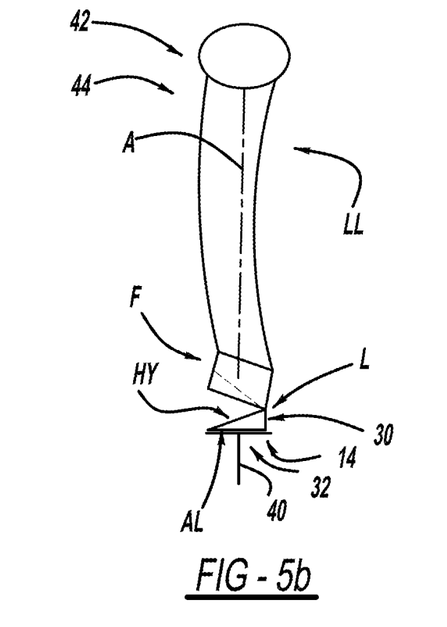
FIG. 5b is a front schematic view of the foot depicted in FIG. 4b about to be corrected with a forefoot wedge insert so that the subtalar joint will be in a neutral position while in the skating boot and/or the skate blade is substantially aligned with the vertical axis through the knee/upper leg area, in accordance with a sixth embodiment of the present invention.
Figure 5C:
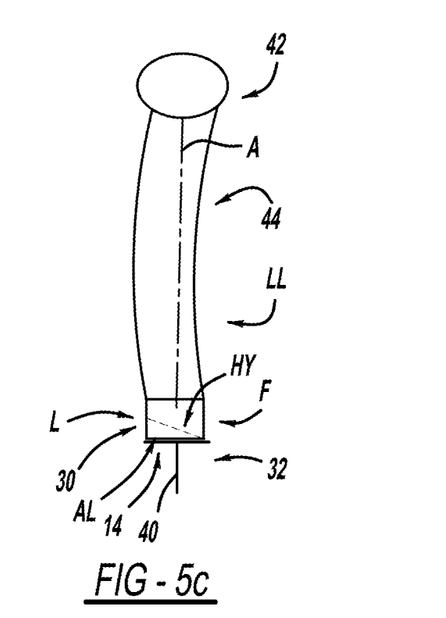
FIG. 5c is a front schematic view of the foot depicted in FIG. 4a corrected with a forefoot wedge insert so that the subtalar joint will be in a neutral position while in the skating boot and/or the skate blade is substantially aligned with the vertical axis through the knee/upper leg area, in accordance with a seventh embodiment of the present invention.
Figure 5D:
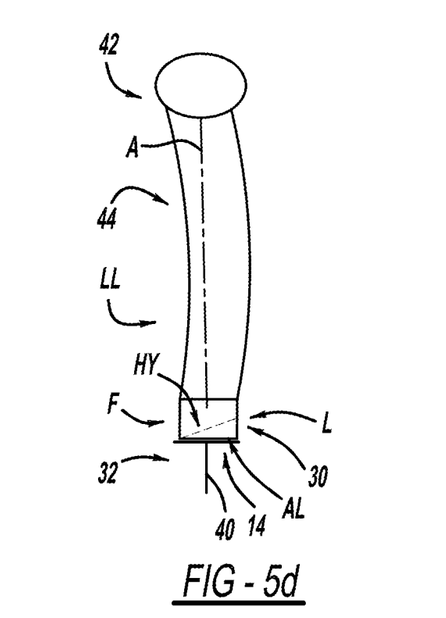
FIG. 5d is a front schematic view of the foot depicted in FIG. 4b corrected with a forefoot wedge insert so that the subtalar joint will be in a neutral position while in the skating boot and/or the skate blade is substantially aligned with the vertical axis through the knee/upper leg area, in accordance with an eighth embodiment of the present invention.
Figure 6:
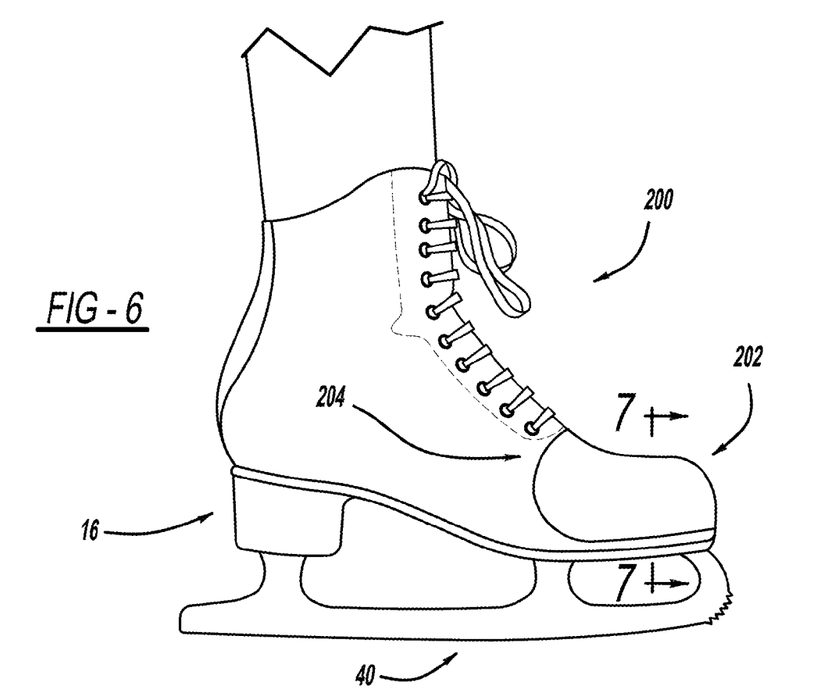
FIG. 6 is an elevational view of a skating boot having an adjustable toe cap section, in accordance with a ninth embodiment of the present invention.
Figure 7A:
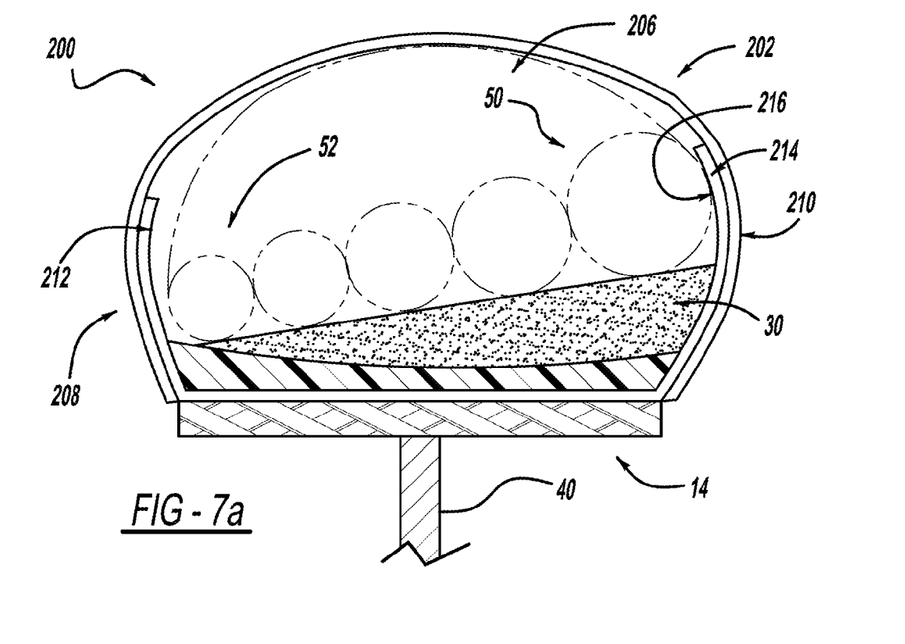
FIG. 7a is a front sectional view taken along line 7-7 of FIG. 6, wherein the forefoot wedge insert of the present invention is correcting a pronating subtalar joint of the right foot so that the subtalar joint is in a neutral position while in the skating boot, in accordance with a tenth embodiment of the present invention.
Figure 7B:
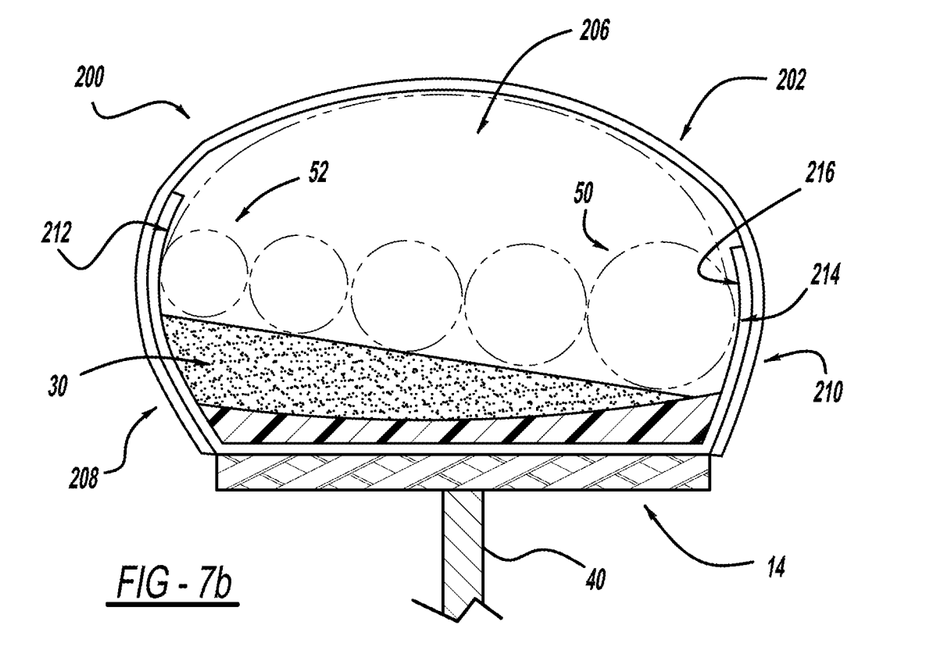
FIG. 7b is a front sectional view taken along line 7-7 of FIG. 6, wherein the forefoot wedge insert of the present invention is correcting a supinating subtalar joint of the right foot so that the subtalar joint is in a neutral position while in the skating boot, in accordance with an eleventh embodiment of the present invention.
Figure 8:
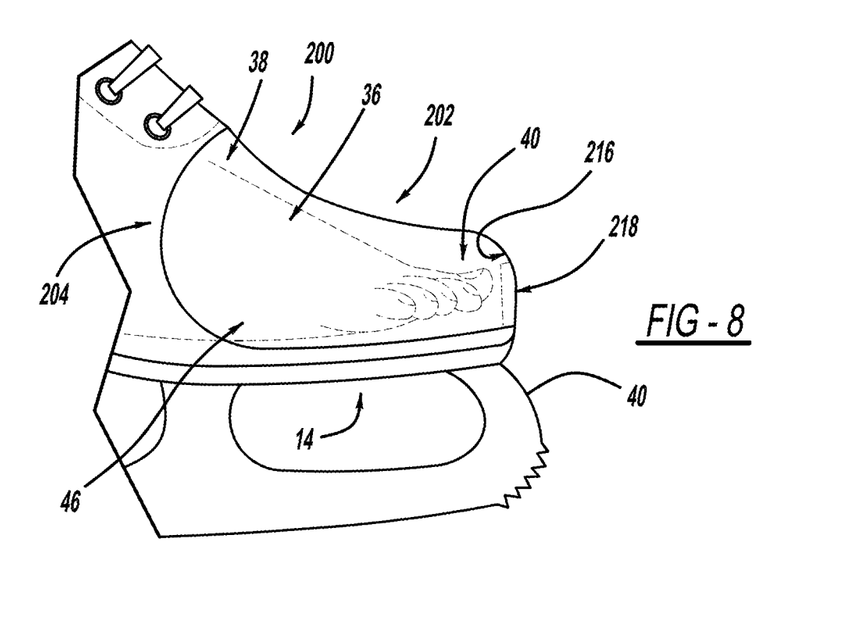
FIG. 8 is a partial elevational view of the wearer's foot inserted into the skating boot depicted in FIG. 6 without the forefoot wedge insert of the present invention, in accordance with a twelfth embodiment of the present invention.
Figure 10:
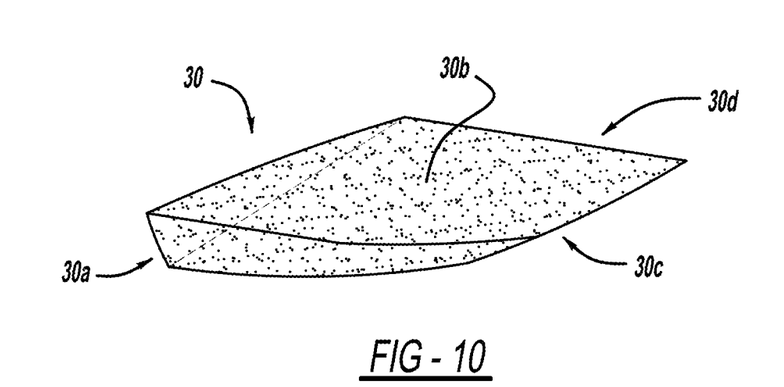
FIG. 10 is a perspective view of the forefoot wedge insert, in accordance with a fourteenth embodiment of the present invention.

Referring specifically to FIG. 10, the forefoot wedge insert 30 can have a substantially wedge-shaped portion 30a for uplifting one side of the wearer's forefoot (indicated by the dotted line) (e.g., see FIGS. 5a-5b), e.g., uplifting the "big toe side" of the forefoot for pronators (e.g., FIG. 5b) and uplifting the "pinky toe side" of the forefoot for supinators (e.g., FIG. 5a). A substantially planar portion 30b can provide a surface for the wearer's foot 38. The planar surface 30b gradually tapers towards the edge 30c opposing the wedge portion 30a as well as gradually tapering towards the edge 30d proximate to the area corresponding to the ball area 46 of the foot 38. Referring to FIGS. 7a, 7b and 10, the forefoot wedge insert 30 may also include a front curved edge that bevels inwardly and downwardly from a top surface of the forefoot wedge insert 30 to a bottom surface of the forefoot wedge insert 30. Thus, for most pronators, the thicker or higher side of the wedge insert 30, i.e., the wedge-shaped portion 30a, will be under the big toe 50 with the tapered portions 30c, 30d extending towards the pinky toe 52 and the ball area 46 (e.g., see FIGS. 5d and 7a), respectively. In this manner, the forefoot area 46 (indicated by the dotted line) of the foot 38 can be uplifted by the wedge-shaped portion 30a to present a somewhat supinated posture; but in actuality, the wedge-shaped portion 30a is merely "leveling" the foot 38 to the foot bed such that the foot 38 cannot pronate thereon. Conversely, for most supinators, the thicker or higher side of the wedge insert 30, i.e., the wedge-shaped portion 30a, will be under the pinky toe 52 with the tapered portions 30c, 30d extending towards the big toe 50 and the ball area 46 (e.g., see FIGS. 5c and 7b), respectively. In this manner, the forefoot area 46 (indicated by the dotted line) of the foot 38 can be uplifted by the wedge-shaped portion 30a to present a somewhat pronated posture; but in actuality, the wedge-shaped portion 30a is merely "leveling" the foot 38 to the foot bed such that the foot 38 cannot supinate thereon.

The forefoot wedge insert 30 can be formed of any material that can be shaped or formed, e.g., by hand, machine, and/or the like. By way of a non-limiting example, the material can be formed of compressed materials (e.g., sawdust/resin mixtures and/or the like), shaped materials (e.g., foams, corks and/or the like), and/or the like, that are shaped or formed by hand or machine (e.g., cutting, shaving, and/or the like). Additionally, the forefoot wedge insert 30 can be formed by computer-aided design/manufacturing techniques (i.e., CAD-CAM) wherein the coordinates of the forefoot wedge insert 30 are entered into a computer program and a rapid prototyping machine forms the finished forefoot wedge insert 30 from a block of material. Regardless, the shape of the forefoot wedge insert 30 can be determined in any way (e.g., trial and error), and the forefoot wedge insert 30 shaped to an appropriate form, e.g., outside of the boot or shoe. However, the shaped forefoot wedge insert 30 would nonetheless still need to uplift the wearer's forefoot area 36 to cause the subtalar joint of the wearer to assume and/or maintain a neutral position to allow the wearer to more easily maintain the skate blade 40 in vertical alignment with the axis through the knee 42/upper leg area 44 to more easily balance over the skate blade 40.

By way of a non-limiting example, the material comprising the forefoot wedge insert 30 should be at least as firm as the foot bed of the skate boot or shoe so as not to deform in any appreciable manner. If the material deforms to any significant degree, the requisite uplifting feature of the forefoot wedge insert 30 could be compromised. Accordingly, relatively hard or firm plastics, foams, gels and/or the like would be most suitable for forming the forefoot wedge insert 30.

The orientation of the forefoot wedge insert 30 will depend on the particular foot configuration of the wearer. For example, pronators will typically use a forefoot wedge insert 30 wherein the thickest portion of the forefoot wedge insert 30 can be placed under the big toe 50, with the forefoot wedge insert 30 gradually tapering away towards the pinky toe 52 and the ball area 46 of the foot 38 (e.g., see FIG. 7a). For another example, supinators will typically use a forefoot wedge insert 30 wherein the thickest portion of the forefoot wedge insert 30 can be placed under the pinky toe 52, with the forefoot wedge insert 30 gradually tapering away towards the big toe 50 and the ball area 46 of the foot 38 (e.g., see FIG. 7b).

The forefoot wedge insert 30 can easily be placed into and removed from the piece of footwear without having to tape, glue or otherwise secure it in place against the interior side of the piece of footwear proximate to the forefoot area 36. In this manner, the wearer can use the forefoot wedge insert 30 in multiple pieces of footwear. However, it should also be appreciated that the wearer can also tape, glue or otherwise secure the forefoot wedge insert 30 in place against the interior side of the piece of footwear proximate to the forefoot area 36. Regardless, use of the forefoot wedge insert 30 can provide the wearer's foot with a "custom fit" to the boot 32 or shoe 34.

Referring specifically to FIGS. 6-9, because the forefoot wedge insert 30 can uplift the wearer's forefoot area 36 (especially the toes 40), and uplift them substantially in cases of severe pronation/supination, it can be necessary to provide a modified boot 200 that includes a selectively adjustable toe cap portion 202 that can be operable to be rotated or lifted upwardly (e.g., along a hinge, pivot, pin, elastic band, or other mechanism 204) to allow more "toe room" for the wearer. In this embodiment, a conventional boot simply can have the top of the standard toe cap portion removed to define an opening 206 over the forefoot area 36, especially the toes 40. The toe cap portion 202 can then be positioned over the opening such that the sides 208, 210 of the toe cap portion 202 overlap the existing side portions 212, 214 of the boot 200. The toe cap portion 202 can be rotationally attached to the body of the boot 202, e.g., by the hinge, pivot, pin, elastic band, or other mechanism 204. When the wearer uses the forefoot wedge insert 30 and feels that his/her toes are being compressed against the interior surface 216 of the toe cap portion 202, the wearer can simply rotate the toe cap portion 202 upwardly (e.g., after first releasing a fastening mechanism 218, e.g., a VELCRO™ strip on the underside of the toe cap portion 202 that mates with a VELCRO™ strip on the outer surface of the boot 202) giving the wearer more toe room, and then secures the adjusted toe cap portion 202 in the desired position by refastening the fastening mechanism 218, e.g., a VELCRO™ strip. In this manner, because of the overlap of the sides 208, 210 of the toe cap portion 202 against the existing side portions 212, 214 of the boot 200 (which are preferably formed of the same color leather), the "raising" of the toe cap portion 202 is hardly noticeable to the ordinary observer.

It should be noted that the forefoot wedge insert 30 can be made to correct deficiencies in already produced boots or shoes that require the wearer to use a forefoot wedge insert to correct a pronation, supination, and/or other foot condition. By way of a non-limiting example, appropriate materials and instructions for the use thereof can be provided in a kit form, allowing wearers of these boots and shoes to form inserts to overcome the afore-mentioned problems.

Although the present invention has been described primarily in reference to ice skating boots (e.g., figure skating boots, hockey boots, and/or the like) and exercise, therapeutic, or physiological footwear, it should be noted that the present invention can be used with any type of footwear, especially those that require the wearer to use a forefoot wedge insert to correct a pronation, supination, and/or other foot condition.

While the invention has been described with reference to an exemplary embodiment, it will be understood by those skilled in the art that various changes can be made and equivalents can be substituted for elements thereof without departing from the scope of the invention. In addition, many modifications can be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A footwear system, comprising:
a skating boot having an upper and a sole;
a skate blade attached to a bottom surface of the sole of the boot; and
a substantially wedge-shaped insert placed on a toe end of the sole, the insert having a perimeter formed by a front curved edge and an opposing back rear edge, and a first side edge and an opposing second side edge, the insert having a planar top surface and a substantially planar bottom surface which are sloped relative to each other forming the wedge-shaped insert;
wherein the wedge-shaped insert gradually tapers in a first direction rearwardly from the front curved edge to the back rear edge, and in second direction from one of the first and second side edges to the other opposing side edge, wherein the front curved edge bevels inwardly and downwardly from the top surface to the bottom surface;
wherein the insert extends, in the first direction, from a toe end of the sole and terminated in an area of the sole that corresponds substantially to a ball area of a wearer's foot; and extends in the second direction laterally across an entire width of the sole so as to extend under all of the toes of the wearer's foot;
wherein the insert upwardly tilts the toes of the wearer's foot relative to a heel portion of the wearer's foot; and
wherein the insert positions or maintains a pronating foot in the subtalar neutral position or positions or maintains a supinating foot in the subtalar neutral position.

2. The invention according to claim 1, wherein the skating boot is selected from the group consisting of figure skating boots, hockey boots, and combinations thereof.

3. A footwear system, comprising:
a skating boot having an upper and a sole;

a skate blade attached to a bottom surface of the sole of the boot;

a substantially wedge-shaped insert placed on a toe end of the sole, the insert having a perimeter formed by a front curved edge and an opposing back rear edge, and a first side edge and an opposing second side edge, the insert having a planar top surface and a substantially planar bottom surface which are sloped relative to each other forming the wedge-shaped insert;

wherein the wedge-shaped insert gradually tapers in a first direction rearwardly from the front curved edge to the back rear edge, and in second direction from one of the first and second side edges to the other opposing side edge, wherein the front curved edge bevels inwardly and downwardly from the top surface to the bottom surface;

wherein the insert extends, in the first direction, from a toe end of the sole and terminated in an area of the sole that corresponds substantially to a ball area of a wearer's foot; and extends in the second direction laterally across an entire width of the sole so as to extend under all of the toes of the wearer's foot;

wherein the insert upwardly tilts the toes of the wearer's foot relative to a heel portion of the wearer's foot; and wherein the insert positions or maintains a pronating foot in the subtalar neutral position or positions or maintains a supinating foot in the subtalar neutral position; and a toe cap portion of the boot, wherein the toe cap portion is selectively operable to be raised upwardly away from a surface of the upper of the boot so as to maintain complete coverage of and accommodate the upwardly tilted toes of the wearer's foot when it is positioned on the insert.

4. The invention according to claim 3, wherein the skating boot is selected from the group consisting of figure skating boots, hockey boots, and combinations thereof.

* * * * *